(12) United States Patent
Leonhard et al.

(10) Patent No.: US 12,023,692 B2
(45) Date of Patent: Jul. 2, 2024

(54) SHOWER SYSTEM

(71) Applicant: KOHLER CO., Kohler, WI (US)

(72) Inventors: Todd W. Leonhard, Sheboygan, WI (US); Qi Cheng, Kohler, WI (US); Douglas J. Brouwer, Sheboygan, WI (US); Keith Ruh, Elkhart Lake, WI (US); Chad J. Cochart, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 113 days.

(21) Appl. No.: 17/579,801

(22) Filed: Jan. 20, 2022

(65) Prior Publication Data

US 2022/0250098 A1 Aug. 11, 2022

Related U.S. Application Data

(60) Provisional application No. 63/146,833, filed on Feb. 8, 2021.

(51) Int. Cl.
*B05B 1/18* (2006.01)
*E03C 1/04* (2006.01)
(Continued)

(52) U.S. Cl.
CPC ............... *B05B 1/18* (2013.01); *E03C 1/057* (2013.01); *G05B 15/02* (2013.01); *E03C 1/0408* (2013.01); *Y10T 137/87676* (2015.04)

(58) Field of Classification Search
CPC ......... B05B 1/18; E03C 1/057; E03C 1/0408; G05B 15/02; Y10T 137/87676
See application file for complete search history.

(56) References Cited

U.S. PATENT DOCUMENTS 5,853,130 A * 12/1998 Ellsworth ............. B05B 12/122
239/69
5,868,311 A * 2/1999 Cretu-Petra ........ G05D 23/1393
236/12.12
(Continued)

FOREIGN PATENT DOCUMENTS

WO WO-2019/079393 A1 4/2019
WO WO-2020/003017 A1 1/2020

OTHER PUBLICATIONS

Extended European Search Report issued in connection with EP Appl. Ser. No. 22153721.0 dated Sep. 30, 2022 (12 pages).
(Continued)

*Primary Examiner* — Daphne M Barry
*Assistant Examiner* — Frederick D Soski
(74) *Attorney, Agent, or Firm* — FOLEY & LARDNER LLP (57) ABSTRACT

A shower system includes on one or more valves and a plurality of showerheads. The plurality of showerheads are electrically coupled to one another and configured to receive electrical signals from one another. The plurality of showerheads are fluidly coupled to the one or more valves and configured to receive water therefrom. The plurality of showerheads includes a sprayer, one or more sensors, and an integrated user interface. The sprayer is configured to dispense water provided by the one or more valves. The one or more sensors are configured to register motion gestures made by a user. The integrated user interface is configured to control operation of the sprayer. The one or more sensors generates an internal signal to the plurality of showerheads corresponding to the motion gesture. One of the plurality of showerheads is a master showerhead.

20 Claims, 4 Drawing Sheets

(51) Int. Cl.
  *E03C 1/05*  (2006.01)
  *G05B 15/02*  (2006.01)

(56) References Cited

U.S. PATENT DOCUMENTS

| | | | |
|---|---|---|---|
| 6,322,005 B1 | 11/2001 | Kern et al. | |
| 9,335,297 B1* | 5/2016 | Cummins | E03C 1/057 |
| 9,783,964 B2 | 10/2017 | Thompson et al. | |
| 9,840,832 B2 | 12/2017 | Seggio et al. | |
| 10,072,403 B2* | 9/2018 | Shirai | G01S 7/4813 |
| 10,178,928 B2* | 1/2019 | Ophardt | G06F 3/0482 |
| 10,287,760 B2* | 5/2019 | Sawaski | E03C 1/057 |
| 10,428,498 B1* | 10/2019 | Montague | E03C 1/057 |
| 10,508,423 B2* | 12/2019 | Herbert | F03B 13/00 |
| 10,578,228 B2* | 3/2020 | Block | F16K 37/0058 |
| 10,625,279 B2 | 4/2020 | L'Henaff et al. | |
| 10,663,938 B2 | 5/2020 | Rexach et al. | |
| 2009/0261282 A1* | 10/2009 | Connors | F16K 51/00 251/129.01 |
| 2009/0293190 A1* | 12/2009 | Ringelstetter | E03C 1/057 4/605 |
| 2011/0186138 A1* | 8/2011 | Hanna | E03C 1/05 137/1 |
| 2011/0226873 A1 | 9/2011 | Bronstein | |
| 2011/0260827 A1* | 10/2011 | Shapiro | E03B 1/04 340/3.1 |
| 2011/0295435 A1* | 12/2011 | Lin | E03C 1/0408 700/284 |
| 2013/0062422 A1* | 3/2013 | Marty | E03C 1/057 236/12.16 |
| 2014/0076415 A1* | 3/2014 | Dunki-Jacobs | E03C 1/0408 137/78.1 |
| 2014/0345726 A1* | 11/2014 | Seggio | E03C 1/057 137/613 |
| 2015/0218784 A1* | 8/2015 | Mazz | E03C 1/055 4/597 |
| 2015/0268342 A1 | 9/2015 | Iott et al. | |
| 2015/0308089 A1* | 10/2015 | Thompson | G05B 15/02 137/78.1 |
| 2015/0322652 A1* | 11/2015 | Mazz | G05D 7/0623 137/583 |
| 2016/0077530 A1* | 3/2016 | Moran | E03C 1/055 700/282 |
| 2017/0096803 A1* | 4/2017 | Schneider | B05B 1/30 |
| 2019/0086890 A1 | 3/2019 | Bradley et al. | |
| 2019/0087510 A1 | 3/2019 | Rexach et al. | |
| 2019/0087788 A1* | 3/2019 | Murphy | E03D 5/105 |
| 2019/0089550 A1* | 3/2019 | Rexach | E03C 1/057 |
| 2019/0090056 A1* | 3/2019 | Rexach | G01N 33/1826 |
| 2019/0262845 A1* | 8/2019 | Bruce | B05B 1/169 |
| 2020/0024836 A1* | 1/2020 | Cortes | E03B 7/078 |
| 2020/0086334 A1 | 3/2020 | Parisi-Amon et al. | |
| 2020/0109542 A1* | 4/2020 | Mavinahally | E03C 1/0408 |
| 2020/0181894 A1 | 6/2020 | Chung | |
| 2020/0354932 A1* | 11/2020 | Gunawardena | G05B 19/416 |
| 2020/0356124 A1* | 11/2020 | Bresson | G05D 23/1393 |

OTHER PUBLICATIONS

Partial European Search Report issued in connection with EP Appl. Ser. No. 22153721.0 dated Jun. 29, 2022 (14 pages).

* cited by examiner

SHOWER SYSTEM

CROSS REFERENCE TO RELATED PATENT APPLICATION

This application claims the benefit of and priority to U.S. Provisional Patent Application No. 63/146,833 filed Feb. 8, 2021, the entire disclosure of which is incorporated by reference herein.

BACKGROUND

The present disclosure relates generally to shower systems. More specifically, the present disclosure relates to shower systems that allow for a user to selectively control multiple showerheads through gesturing movements.

SUMMARY

At least one embodiment relates to a shower system. The shower system includes on one or more valves and a plurality of showerheads. The plurality of showerheads are electrically coupled to one another and configured to receive electrical signals from one another. The plurality of showerheads are fluidly coupled to the one or more valves and configured to receive water therefrom. The plurality of showerheads includes a sprayer, one or more sensors, and an integrated user interface. The sprayer is configured to dispense water provided by the one or more valves. The one or more sensors are configured to register motion gestures made by a user. The integrated user interface is configured to control operation of the sprayer. The one or more sensors generates an internal signal to the plurality of showerheads corresponding to the motion gesture. One of the plurality of showerheads is a master showerhead.

Another embodiments relates to a shower system. The shower system includes a plurality of showerheads and one or more valves fluidly coupled to the plurality of showerheads. The plurality of showerheads has one or more spray modes and is electrically coupled to one another and configured to receive electrical signals from one another. The plurality of showerheads includes a sprayer, one or more sensors, and an integrated user interface. The sprayer is configured to dispense water provided by the one or more valves. The one or more sensors are configured to register motion gestures made by a user. The integrated user interface is configured to control operation of the sprayer. The one or more valves are fluidly coupled to the one or more spray modes to selectively change the spray mode in response to the motion gesture.

Another embodiment relates to a shower system. The shower system includes a plurality of showerheads, one or more sensors operably coupled to the plurality of showerheads, and a controller operably coupled to the plurality of showerheads. The one or more sensors are configured to register motion gestures made by a user. The one or more sensors includes a first motion-sensing sensor, a second motion-sensing sensor, and a third motion-sensing sensor. The first motion-sensing sensor is configured to generate an internal signal. The second motion-sensing sensor is configured to control a temperature of water delivered to the plurality of showerheads. The third motion-sensing sensor is configured to control the temperature of water delivered to the plurality of showerheads. The controller includes a processing circuit configured to receive a command from the one or more sensors. The controller is configured to control operation of at least one of the plurality of showerheads in response to receiving the command.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, most conventional shower systems that include multiple water delivery devices (e.g., overhead shower, wall-mounted spay heads, hand-spayers, etc.) require a user to adjust the settings of the water delivery devices through a shower handle or a central user interface that is separate and located remotely from the water delivery devices. These remote user interfaces can be difficult or inconvenient to access while showering. In addition, these central user interfaces can be unintuitive to operate for a typical user. Additionally, at times while showering, a user may have their vision impaired (e.g., while using shampoo) which may make operating the handle or remote user interface difficult.

Furthermore, shower systems offer consumers limited options, which results in uniformity across showerheads. Accordingly, a system that provides touchless control of a showerhead that is configurable, provides additional features not offered in conventional shower systems, and provides the user control of the showerheads in an easy to control manner would be desirable.

Referring generally to the figures, disclosed herein is a shower system that includes a plurality of water delivery devices, such as wall-mounted spray heads, overhead sprayers, hand sprayers, or the like. The system is configured to allow a user to control the water delivery device through gesturing movements or through touch controls that are disposed directly on each of the water delivery devices themselves, so as to provide for an improved user experience. In addition, each of the water delivery devices of the system is configured to be designated as a master control unit, where the remaining devices can be designated as slave units to be controlled by the master control unit. According to an exemplary embodiment, the disclosed water delivery device includes one or more spray nozzles, sensors for registering gestures, and a touch-based interface disposed directly on the device itself. If the user desires, the user may perform a gesturing movement (e.g., using their hands, arms, fingers, head, legs) towards sensors disposed on the device to control the operation of the device. The user may also control the operation of the device through a touch-based interface (e.g., capacitive sensors, etc.) and/or through voice control. The gestures, touch-based controls, and voice control may adjust the settings of the water delivery device itself that the interface is disposed on or adjust the settings of the other water delivery devices in the system. The settings may include adjusting water temperature, adjusting water flow rate, and activating or deactivating one or more of the devices in the system. In this manner, the disclosed system allows for improved control of the individual water delivery devices in a shower system.

According to another exemplary embodiment, gesturing to, touching, and/or providing an audio command to the showerhead may adjust various other settings of the water delivery devices including, but not limited to, audio speakers, lighting, and spray modes.

Figure 1:
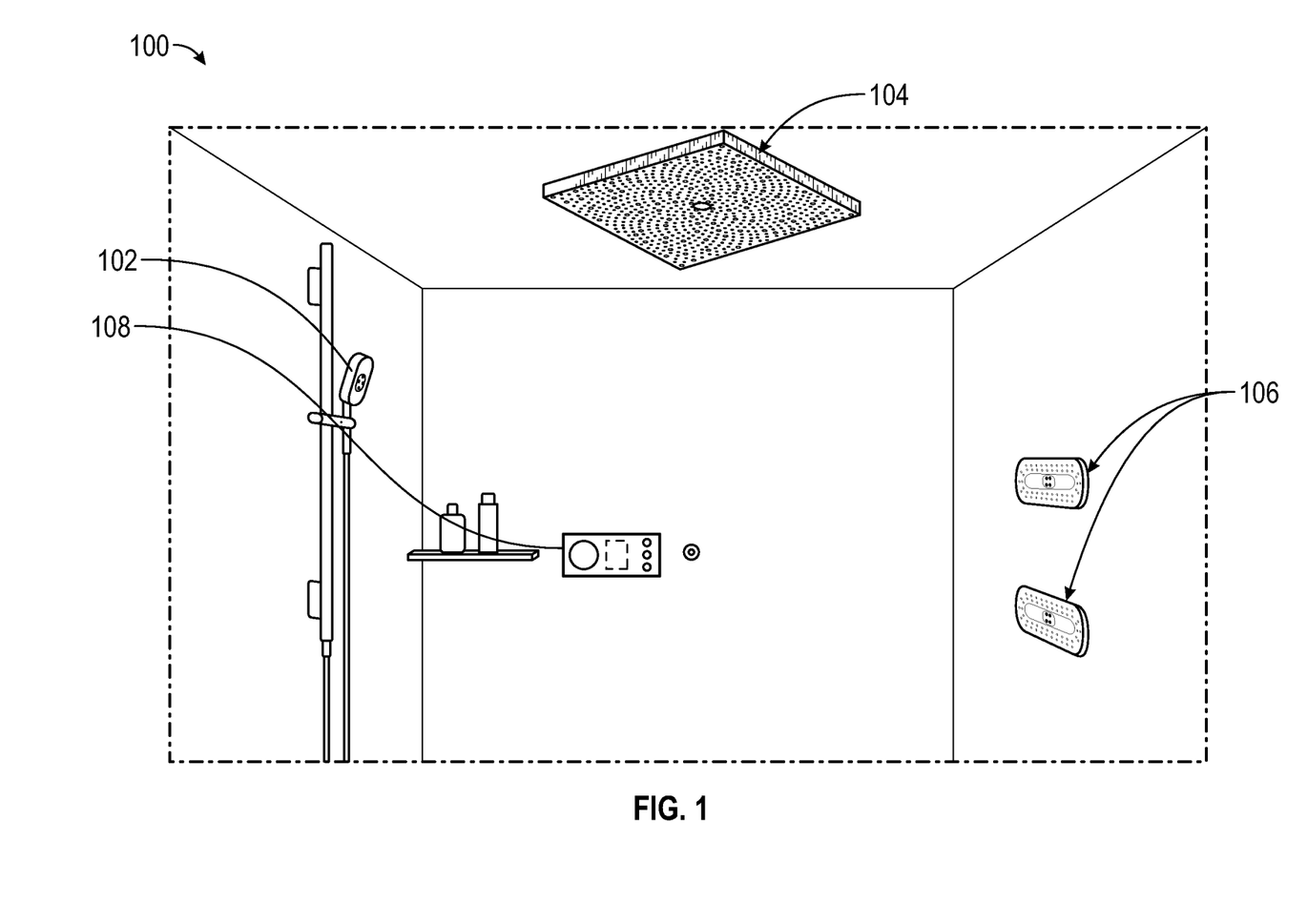
FIG. 1 is a perspective view of a shower system according to an exemplary embodiment.

Referring to FIG. 1, a shower system 100 is shown according to an exemplary embodiment. The shower system 100 may include a water delivery device, shown as a showerhead 102, although the shower system 100 can include other types of water delivery devices, such as a handheld sprayer. The shower system 100 may also include another water delivery device, shown as overhead "rain" showerhead 104. The overhead rain showerhead 104 may also incorporate audio speakers and a lighting system, according to an exemplary embodiment.

The shower system 100 also includes an individual water delivery device, shown as a wall-mounted showerhead 106. Although shown with two wall-mounted showerheads 106, the shower system 100 may include any number of wall-mounted showerheads 106. Accordingly, the wall-mounted showerheads 106 may be disposed at various positions within the shower system 100. As discussed in greater detail herein, the wall-mounted showerheads 106 may be controlled individually by gesturing movements by the user in proximity of the respective showerhead 106. Through the gesturing movements, the user may control various water dispensing settings, such as water temperature, water flow rate, which of the wall-mounted showerhead 106 are active, and shower modes (e.g., different modes to affect the rhythm of the water dispensing). The user may also control other functions, including, but not limited to, activating or deactivating sound, controlling which audio is playing, and the lighting settings. As also discussed in greater detail herein, the wall-mounted showerheads 106 may also be controlled through a direct touch-based interaction with the wall-mounted showerheads 106.

The shower system 100 may also include a separate interface 108 (e.g., controller). The interface 108 is communicable with the overhead rain showerhead 104 and the wall-mounted showerheads 106 and is configured to provide electronic signals to the overhead rain showerhead 104 and the wall-mounted showerheads 106. The user may utilize the interface 108 to control the settings of the overhead rain showerhead 104 and the wall-mounted showerheads 106. For example, the user may utilize the interface 108 to activate the overhead rain showerhead 104 and the wall-mounted showerheads 106 by rotating a knob 110 (e.g., dial, handle), touching a touch display 112 (e.g., touch-activated control), and/or pressing a button 114 (e.g., switch) on the interface 108. The user may also utilize the touchless controls of the wall-mounted showerheads 106 to control the interface 108. The interface 108 may also be used to program various settings into the interface 108. For example, the user may program the interface 108 to create a program such that when the user first begins using the shower system 100, the interface 108 only activates the wall-mounted showerheads 106. After a specified period of time has passed, the interface 108 then activates the overhead rain showerhead 104. The user may also program various programs into the interface 108 to control the audio and lighting settings of the overhead rain showerhead 104 and the wall-mounted showerheads 106.

In some embodiments, the interface 108 may be, or work in conjunction, with an external interface, such as a mobile device. The external interface may be a mobile smartphone or a "smart home" (e.g., a home with automation enablement). The external interface may provide commands in the form of electronic signals to the interface 108. The commands may be manually set by the user or automatically generated by the external interface. The interface 108 may receive commands directed to the water dispensing settings, including, but not limited to, activating or deactivating the shower system 100, adjusting water temperature, or adjusting water flow rate by the external interface. The interface 108 may receive commands directed to the shower system 100, including, but not limited to, audio files, shower themes, local news, and local weather reports.

Figure 2:
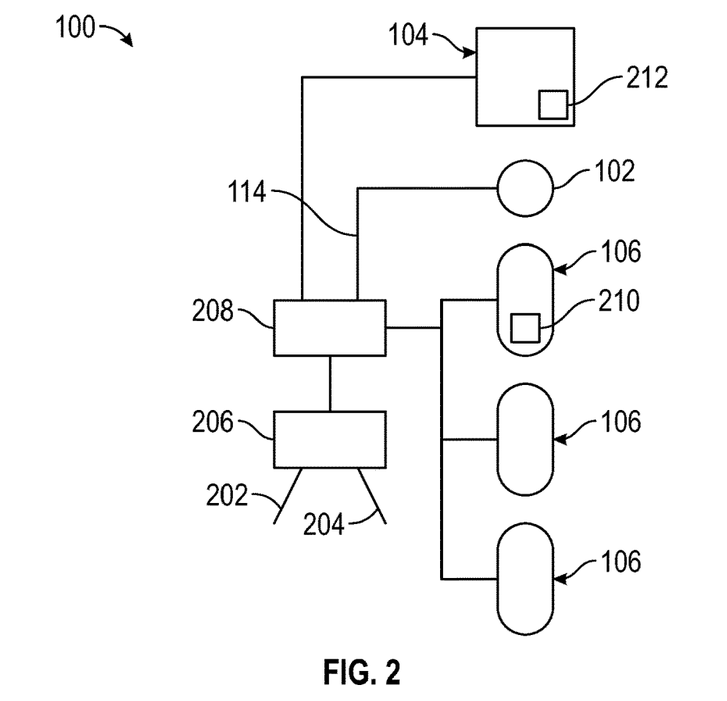
FIG. 2 is a schematic view of a shower system according to an exemplary embodiment.

Referring to FIG. 2, a schematic view of a shower system 100 is shown according to an exemplary embodiment. The shower system 100 includes a cold water supply 202 (e.g., conduit, pipeline) and a hot water supply 204 (e.g., conduit, pipeline). The shower system 100 may also include a mixing valve 206. The mixing valve 206 is disposed behind (e.g., not exposed to a user of the shower system 100) a wall of the shower system 100. The mixing valve 206 is fluidly coupled to the cold water supply 202 and the hot water supply 204 and is configured to receive, and accordingly mix, the cold water and hot water. The mixing valve 206 is configured to adjust the water temperature after the user utilizes the interface 108, the showerhead 102, or the wall-mounted showerhead 106. The mixing valve 206 is further configured to adjust the water flow rate. In some configurations, the water temperature and the water flow rate are controlled by several mixing valves 206.

The shower system 100 may also include a three-way diverter 208 (e.g., distributor). The three-way diverter 208 is fluidly communicable with the mixing valve 206 and is configured to receive the mixed water from the mixing valve 206. The three-way diverter 208 is configured to provide the mixed water to the various water delivery devices of the shower system 100. After the user selects which showerheads to activate (e.g., the showerhead 102, the overhead rain showerhead 104, and the wall-mounted showerhead 106), the three-way diverter 208 may direct mixed water to the selected showerheads via supply conduits. The three-way diverter 208 includes a plurality of stop valves. If the user chooses to not utilize a showerhead, the three-way diverter 208, does not provide mixed water to the showerhead by activating the stop valve associated to that showerhead. The three-way diverter 208 may then direct the mixed water to the other supply conduits. For example, if the user only utilizes the showerhead 102, the three-way diverter 208 may deactivate the stop valve that was previously preventing water flow to the showerhead 102. According to other exemplary embodiments, the shower system 100 includes a plurality of solenoid valves associated with each wall-mounted showerhead 106. The solenoid valves may be in fluid communication with different spray nozzles of each showerhead 106, so as to selectively provide different spray patterns or spray modes, depending on which solenoid valve is activated.

The wall-mounted showerheads 106 are electronically coupled to a power supply and configured to receive electricity from the power supply. In some embodiments, a single wall-mounted showerhead 106 receives electricity from the power supply. In these embodiments, the wall-mounted showerhead 106 is electronically communicable with the remaining wall-mounted showerheads 106 and is configured to provide electricity to the other wall-mounted shower-heads 106.

Each of the wall-mounted showerheads 106 may also include a showerhead controller 210 (e.g., networking chip). The showerhead controller 210 facilitates communication between the wall-mounted showerheads 106. The showerhead controller 210 may generate an electronic signal and then provide that electronic signal to the controllers 210 disposed in each of the remaining wall-mounted showerheads 106. In this way, the user may provide a single command to a wall-mounted showerhead 106 which is then conveyed to the remaining wall-mounted showerheads 106.

In some embodiments, only a single wall-mounted showerhead 106 includes the showerhead controller 210. In these embodiments, the wall-mounted showerhead 106 is communicable with the remaining wall-mounted showerheads 106 and is configured to provide and receive commands to and from the remaining wall-mounted shower-heads 106. In these embodiments, the wall-mounted showerheads 106 may be connected via a communication conduit, a Bluetooth connection, near-field communication (NFC), Wi-Fi connection, a local area network (LAN), or any other form of local communication protocol.

The user may designate one of the wall-mounted showerheads 106 as a master showerhead. The user may designate the master showerhead through the wall-mounted shower 106 or through the interface 108. For example, the user may make a specific gesture to one of the wall-mounted showerheads 106 to assign that wall-mounted showerhead 106 as the master showerhead. The master showerhead allows the user to utilize control all of the wall-mounted showerheads 106 through only providing commands to the master showerhead.

For example, if the user increases the water temperature of dispensed water on the master showerhead, the remaining showerheads will also increase the water temperature of the dispensed water for the remaining showerheads. In this manner, the user has effortless control of all of the wall-mounted shower heads 106 through a single command. In another exemplary embodiment, when the user increases the temperature of dispensed water on the master showerhead, the master showerhead may be configured so that it does not alter the water temperature of the dispensed water for the remaining showerheads. Accordingly, the user may utilize a door and/or window of the shower system 100 to vent and/or control the temperature of environment of the shower system 100 to obtain a desirable temperature.

In another exemplary embodiment, the user may designate multiple master showerheads. Each master showerhead may be configured to then control specified showerheads by the user. For example, if the wall-mounted showerheads 106 are disposed on two different walls of the shower system 100, the user may designate a master showerhead per wall. Each master showerhead may then be configured to control the showerheads disposed on their respective wall. In this manner, the user has effortless control of the wall-mounted showerheads 106 for each wall. In another example embodiment, the master showerhead may be configured to also control the showerhead 102 and/or the overhead rain showerhead 104.

In another exemplary embodiment, the user may provide a command to one of the remaining showerheads to individually control that wall-mounted showerhead 106. In this manner, the user is provided both the ease of controlling all of the wall-mounted showerheads 106 simultaneously, while also having the ability to control individual wall-mounted showerheads 106.

After a user provides a command to the master showerhead, the showerhead controller 210 of the master controller generates an internal signal and an external signal based on the command. As discussed in greater detail herein, the internal signal is utilized to control operation of the master showerhead. The showerhead controller 210 also provides the external signal to the remaining showerheads. The showerhead controllers 210 of the remaining showerheads receive the external signal. The received external signal is then utilized to control operation of the remaining showerheads.

The overhead rain showerhead 104 may also include an overhead controller 212 (e.g., networking chip). Similar to the showerhead controller 210, the overhead controller 212 facilitates the overhead rain showerhead 104 to communicate with the wall-mounted showerheads 106. In this manner, if the user provides a command to the wall-mounted showerheads 106, the overhead rain showerhead 104 may also be adjusted according to the user command.

Figure 3:
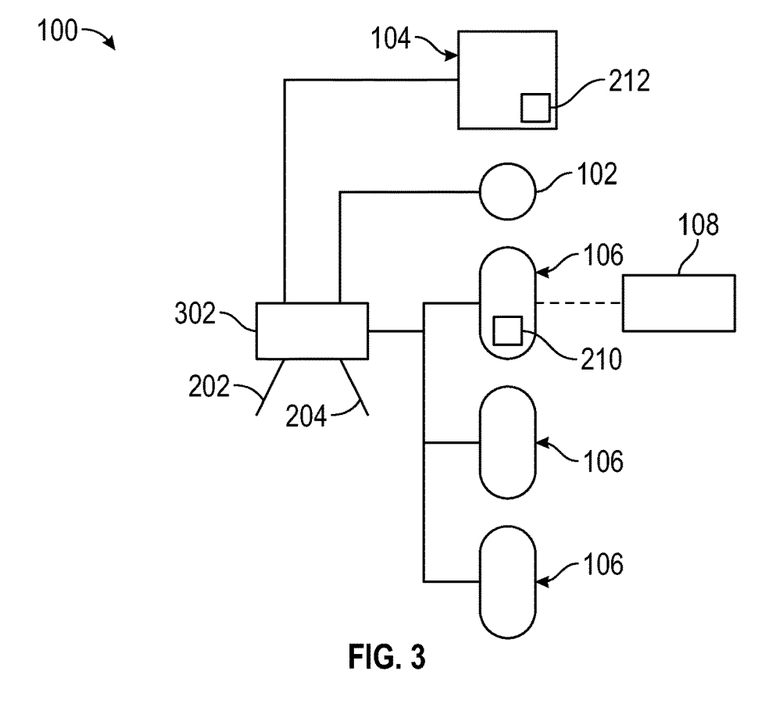
FIG. 3 is a schematic view of another shower system according to another exemplary embodiment.

Referring to FIG. 3, a schematic view of the shower system 100 is shown, according to another exemplary embodiment. The showerhead controller 210 may be communicable with the interface 108 so that when the user utilizes the interface 108, the interface 108 generates and provides an electronic signal to the showerhead controller 210. In this manner, the user may control the wall-mounted showerheads 106 through the interface 108.

The overhead controller 212 may also be communicable with the interface 108 so that when the user utilizes the interface 108, the interface 108 generates and provides an electronic signal to the overhead controller 212.

In some embodiments, the shower system 100 may utilize a digital valve 302. The digital valve 302 is fluidly coupled to the cold water supply 202 and the hot water supply 204 and is configured to receive, and accordingly mix, the cold water and hot water. The digital valve 302 is configured to adjust the water temperature after the user utilizes the interface 108, the showerhead 102, or the wall-mounted showerhead 106. The mixing valve 206 is further configured to adjust the water flow rate. According to other exemplary embodiments, the shower system 100 may include a manually-operable valve to control water flow rate, etc.

The digital valve 302 may be further configured to divert water to the various showerheads of the shower system 100. After the user selects which showerheads to activate (e.g., the showerhead 102, the overhead rain showerhead 104, and the wall-mounted showerhead 106), the digital valve 302 may direct mixed water to the selected showerheads via their respective supply conduits. The digital valve 302 includes a plurality of stop valves. If the user does not utilize a showerhead, the digital valve 302, does not provide mixed water to the showerhead by activating the stop valve for that showerhead. The digital valve 302 may then direct the mixed water through the other supply conduits. For example, if the user only utilizes the showerhead 102, the digital valve 302 may deactivate the stop valve that was previously preventing water flow to the showerhead 102.

Figure 4:
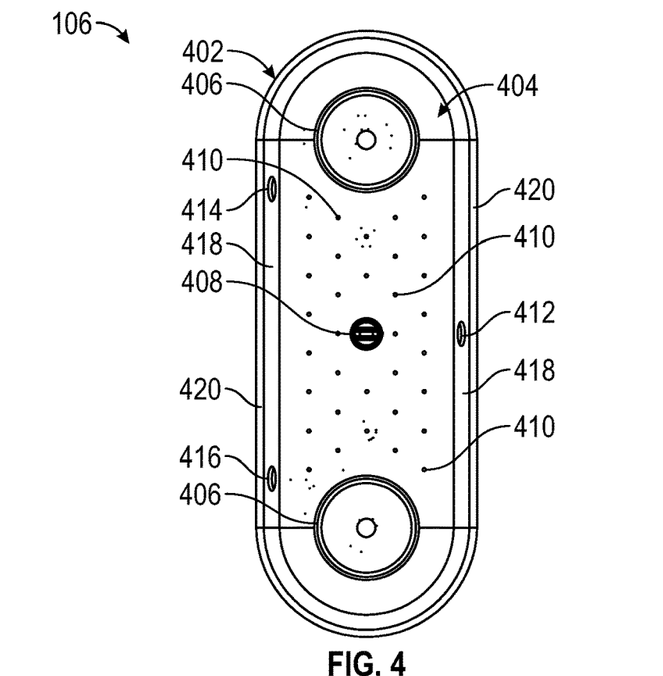
FIG. 4 is a front view of a wall-mounted showerhead according to an exemplary embodiment.

Referring now to FIG. 4, a front view of a wall-mounted showerhead 106 is shown according to an exemplary embodiment. The wall-mounted showerhead 106 includes a showerhead casing 402 (e.g., body, enclosure). The showerhead casing 402 is fluidly coupled to either the mixing valve 206 or the digital valve 302 and is configured to receive mixed water from either of the mixing valve 206 or the digital valve 302. The showerhead casing 402 is configured to be rotatable by the user so that the user may have further control in the manner in which water is dispensed. The showerhead casing 402 includes a plurality of seals to prevent water ingress within the showerhead casing 402. In some embodiments, the showerhead casing 402 is disposed within a cavity of a wall of the shower system 100. In various embodiments, the showerhead casing 402 is integrated into the wall of the shower system 100.

The showerhead casing 402 includes a sprayer face 404 (e.g., a dispensing surface). The sprayer face 404 is the exposed portion of the wall-mounted showerhead 106. The sprayer face 404 includes a variety of sprayer types. In this manner, the user may be provided various spraying options including, but not limited to, a larger area water dispensing (e.g., water is dispensed along the area of the sprayer face 404), a targeted water dispensing mode (e.g., water is dispensed towards specific locations of the sprayer face 404), or a misting water dispensing mode (e.g., mist water is dispensed from the sprayer face 404).

The sprayer face 404 includes a larger sprayer 406 (e.g., spray nozzles, fluid output devices). Although there are two larger sprayers 406 shown, there may be any number of the larger sprayers 406 disposed anywhere along the sprayer face 404. The larger sprayer 406 dispenses water across a larger dispensing area of a portion of the sprayer face as compared to the other sprayers disposed on the sprayer face 404.

The sprayer face 404 includes a concentrated sprayer 408 (e.g., spray nozzles, fluid output devices). Although a single concentrated sprayer 408 shown, there may be multiple concentrated sprayers 408 disposed anywhere along the sprayer face 404. In an exemplary embodiment, the concentrated sprayer 408 is configured to dispense a higher flow rate water stream as compared to the water streams dispensed by the other sprayers. In other embodiments, the concentrated sprayer 408 may include a misting nozzle which produces a mist.

The sprayer face 404 may also include a plurality of smaller sprayers 410 (e.g., spray nozzles, fluid output devices). The plurality of smaller sprayers 410 be disposed in any configuration along the sprayer face 404. The plurality of smaller sprayers 410 dispense water across a larger area of the entire portion of the sprayer face 404 as compared to the other sprayers disposed on the sprayer face 404.

The sprayer face 404 may utilize the various sprayers (e.g., the larger sprayer 406, the concentrated sprayer 408, and/or the plurality of smaller sprayers 410) to dispense water in various spray function sequences. For example, in a "massage mode," the various sprayers may be programmed to spray in a sequence to provide a massaging effect to the user.

The sprayer face 404 may utilize the various sprayers to dispense water in a sequence corresponding to audio chosen by the user. In an example embodiment, the showerhead controller 210 of the wall-mounted showerhead 106 receives signals corresponding to the audio. The sprayer face 404 may then dispense water from the various sprayers in a manner that correlates with the audio. The various sprayers may be assigned to different tone types in the audio file. For example, if an audio file incorporates a tone in the low-pitched ranges (e.g., similar to tones produced by a bass instrument), the larger sprayer 406 may be configured to dispense water to corresponded to the frequency, pitch, and range of that low-pitched tone.

The showerhead casing 402 may also include a first motion-sensing sensor 412. The sensor may be a capacitive sensor, an infrared sensor, an ultrasonic sensor, or any other sensor configured to register gesturing of a user. The first motion-sensing sensor 412 may be disposed anywhere along the wall-mounted showerhead 106. In some embodiments, the first motion-sensing sensor 412 is disposed adjacent to the wall-mounted showerhead 106. When the user gestures at, towards, or near the first motion-sensing sensor 412 (e.g., waving their hands, shaking their head, making a symbol with their hand), the first motion-sensing sensor 412 generates an internal signal. The internal signal may be configured to activate or deactivate the wall-mounted showerhead 106. In an exemplary embodiment, gesturing to activate or deactivate the wall-mounted showerhead 106 may also result in generating an external signal. The external signal may be transmitted to the remaining wall-mounted showerheads 106 to also activate or deactivate the remaining wall-mounted showerheads 106. In another exemplary embodiment, gesturing to activate or deactivate the wall-mounted showerhead 106 only results in activating or deactivating that specific wall-mounted showerhead 106. In various embodiments, various gestures to the first motion-sensing sensor 412 may result in, but is not limited to, adjusting the water temperature or water flow rate, controlling the audio speaker, controlling the lighting display, and selecting a spray sequence.

The showerhead casing 402 may also include a second motion-sensing sensor 414 and a third motion-sensing sensor 416. The sensors may be a capacitive sensor, an infrared sensor, an ultrasonic sensor, or any other sensor configured to register gesturing of a user. The second motion-sensing sensor 414 and the third motion-sensing sensor 416 may be disposed anywhere along the wall-mounted showerhead 106. In another exemplary embodiment, the second motion-sensing sensor 414 and the third motion-sensing sensor 416 are disposed adjacent to the wall-mounted showerhead 106. The second motion-sensing sensor 414 and the third motion-sensing sensor 416 co-operate so that when a user gestures at, towards, or near the second motion-sensing sensor 414 and the third motion-sensing sensor 416, the second motion-sensing sensor 414 and the third motion-sensing sensor 416 may also register the direction in which the user gestures. For example, if the user waves their hand to first pass the second motion-sensing sensor 414 and to then pass the third motion-sensing sensor 416, the wall-mounted showerhead 106 may then decrease the water temperature by a specified amount. Furthermore, the speed in which the user gestures past the second motion-sensing sensor 414 and then the third motion-sensing sensor 416 may result in how large the drop in water temperature may be. The shower system 100 calculates the speed in which the user gestures past the sensors by registering the time difference between the gesture past the second motion-sensing sensor 414 and the third motion-sensing sensor 416. For example, if the user waves their hand past the sensors in a short time frame, the shower system 100 may decrease the water temperature by a larger specified amount as compared to as if the user waved their hand past the sensor in a longer time frame. The second motion-sensing sensor 414 and the third motion-sensing sensor 416 are further configured to be operated individually. For example, if a user waves their hand only past the second motion-sensing sensor 414, the wall-mounted showerhead 106 may then activate the audio speakers. In another example, if the user places their hand in close proximity to the third motion-sensing sensor 416 for an extended period of time, the wall-mounted showerhead 106 may change the color of the lighting.

The showerhead casing 402 may also include a touch-sensitive surface 418 (e.g., touch-enabled area). The touch-sensitive surface 418 may include a capacitive sensor, an infrared sensor, an ultrasonic sensor, or any other sensor configured to register a touch by the user. Furthermore, the touch-sensitive surface 418 may include a physical interface such as buttons, switches, knobs, etc. The touch-sensitive surface 418 may be used in conjunction with the gesturing motion-sensing sensors to provide the user more control of the wall-mounted showerhead 106. For example, the user may wave past the motion-sensing sensors to then select that they would like to change the water temperature. The user may then slide their hand on the touch-sensitive surface 418 to increase or decrease the temperature. The touch-sensitive surface 418 may be configured to have designated touch areas in which the user touches to adjust a setting of the wall-mounted showerhead 106. For example, a user may touch a portion of the touch-sensitive surface 418 designated to audio volume. The user may then wave their hands past the motion-sensing sensors to increase or decrease the audio volume.

In an exemplary embodiment, the showerhead casing 402 includes a microphone. The microphone is configured to receive and recognize an audio command from the user. The microphone may then provide a signal to the showerhead controller 210. In this manner, the wall-mounted showerhead 106 may also utilize voice control. For example, the user may speak to the wall-mounted showerhead 106 to activate a specific showering mode. The shower system 100 may then activate the showering mode specified by the user. The user may use the voice control in conjunction with gesturing to and/or touching the wall-mounted showerhead 106.

The showerhead casing 402 may also include a lighting surface 420 (e.g., illumination area). In an exemplary embodiment, the lighting surface 420 is disposed on an outside perimeter of the showerhead casing 402. In these embodiments, when activated, the lighting surface 420 provides the user an aesthetically pleasing view of an illuminated perimeter around the wall-mounted showerhead 106. In another exemplary embodiment, the lighting surface 420 is disposed at a rear portion of the showerhead casing 402. In these embodiments, the lighting surface 420, when activated, illuminates an area of the wall adjacent to the wall-mounted showerhead 106. In these embodiments the lighting surface 420 provides the user an aesthetically pleasing view of an illuminated background around the wall-mounted showerhead 106. In some embodiments, the showerhead casing 402 incorporates the lighting surfaces 420 located along the perimeter and the rear portion of the showerhead casing 402. The lighting surface 420 is configured to display colors across the entire color spectrum and may display several colors simultaneously. In this manner, the user can develop a theme by displaying a plurality of colors.

In an exemplary embodiment, the interface 108 may receive information related to the weather from the external interface. In these embodiments, the user may set the lighting surface 420 to display colors associated with the weather. For example, if it is currently raining, the lighting surface 420 may display blue tones to communicate to the user that it is currently raining.

Figure 5:
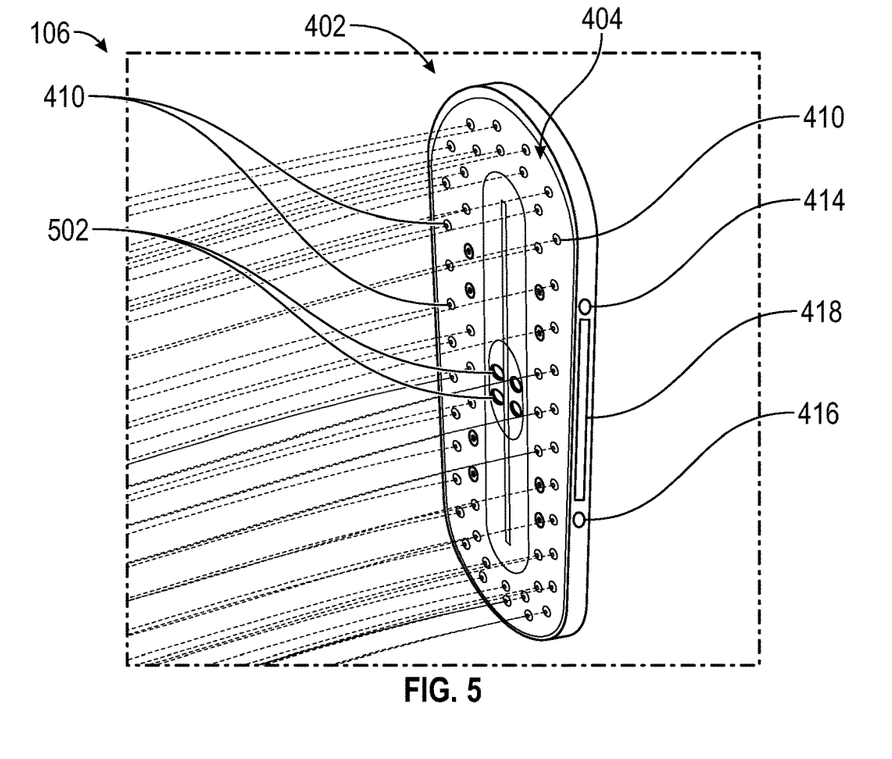
FIG. 5 is a perspective view of a wall-mounted showerhead according to another exemplary embodiment.
Figure 6:
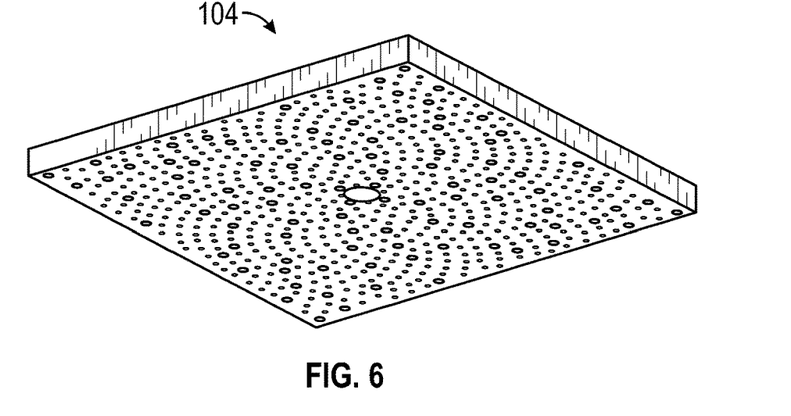
FIG. 6 is a perspective view of an overhead rain showerhead shown in FIG. 1.
Figure 7:
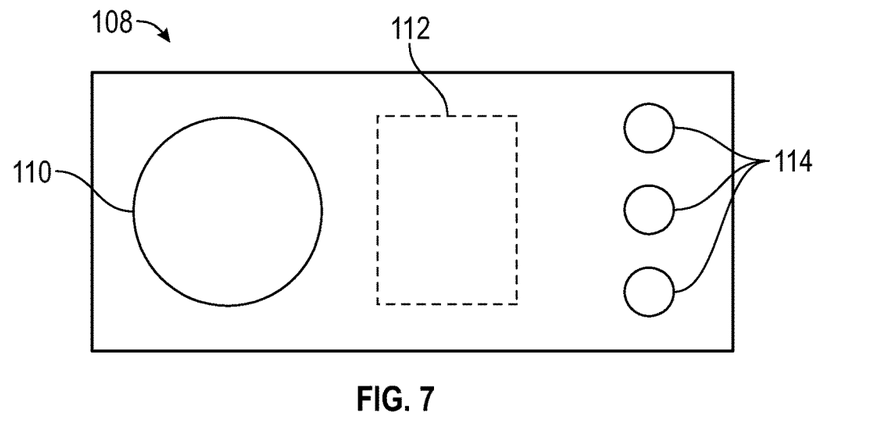
FIG. 7 is a perspective view of an interface shown in FIG. 1.

Referring now to FIG. 5, a wall-mounted showerhead 106 is shown according to another exemplary embodiment. The showerhead casing 402 may also include audio speakers 502 (e.g., loudspeaker). Although shown disposed in the center of the wall-mounted showerhead 106, the audio speakers 502 may be disposed anywhere along the showerhead casing 402, including at a rear portion. In some embodiments, the audio speakers 502 are disposed adjacent to the wall-mounted showerhead 106. In an exemplary embodiment, the user may play audio of their choosing through the audio speakers 502. In an exemplary embodiment, the showerhead controller 210 of the wall-mounted showerhead 106 receives signals corresponding to the audio. The audio speakers 502 may then output the audio. In an exemplary embodiment, the wall-mounted showerheads 106 work in conjunction to output the audio file through the audio speakers 502. In this manner, the audio speakers 502 cooperate to provide the user an immersive experience.

In an exemplary embodiment, the interface 108 may receive information related to the weather from the external interface. In these embodiments, the user may set the audio speakers 502 to output an audio file associated with the weather. For example, if it is currently raining, the audio speakers 502 may output an audio file of rain to communicate to the user that it is currently raining.

In an exemplary embodiment, the wall-mounted showerhead 106 incorporates programming modes that controls the various sprayers, the lighting surface 420, and the audio speakers 502. For example, a user may select a programming mode directed to helping the user prepare to sleep for the night. The various sprayers may then be programmed to decrease water flow rateover the duration of the shower. Furthermore, the lighting surface 420 may filter blue light and to decrease intensity over the duration of the shower. The audio speakers may output an audio file configured to relax the user.

Figure 8:
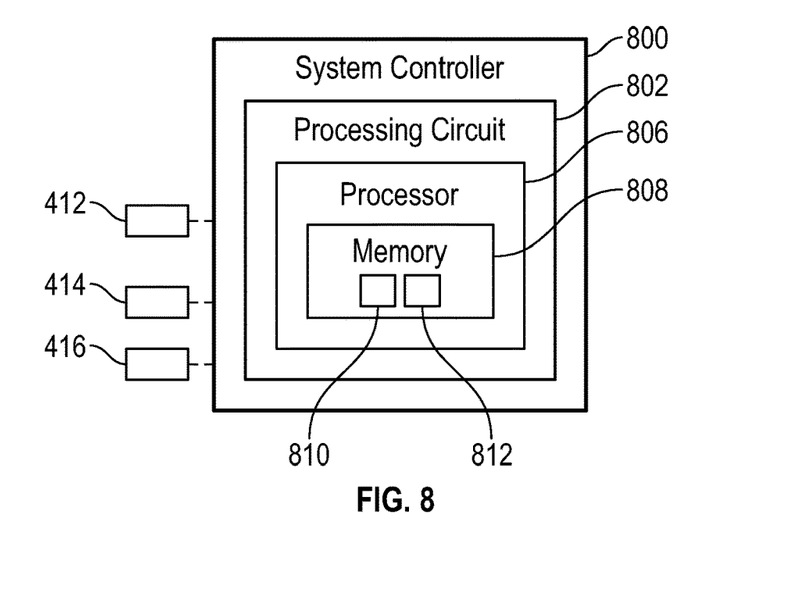
FIG. 8 is a schematic view of a system controller for a shower system, according to another exemplary embodiment.

Referring to FIG. 8, a schematic view of a system controller 800 for the shower system 100 is shown. The system controller 800 is in electronic communication (e.g., via a wired connection, via a wireless connection, etc.) between the showerhead 102, the overhead rain showerhead 104, the wall-mounted showerheads 106, and/or the interface 108. The user may utilize the system controller 800 to control the settings of the showerhead 102, the overhead rain showerhead 104, the wall-mounted showerheads 106, and/or the interface 108. In an example embodiment, the system controller 800 is disposed and/or integrated in the interface 108. In another example embodiment, the system controller 800 is disposed and/or integrated into the showerhead controller 210.

The system controller 800 includes a processing circuit 802. The processing circuit 802 includes a processor 806 and a memory 808. The processor 806 may include a microprocessor, an application-specific integrated circuit (ASIC), a field-programmable gate array (FPGA), etc., or combinations thereof. The memory 808 may include, but is not limited to, electronic, optical, magnetic, or any other storage or transmission device capable of providing a processor, ASIC, FPGA, etc. with program instructions. This memory 808 may include a memory chip, electrically erasable programmable read-only memory (EEPROM), erasable programmable read only memory (EPROM), flash memory, or any other suitable memory from which the controller 620 can read instructions. The instructions may include code from any suitable programming language. The memory 808 may include various modules that include instructions which are configured to be implemented by the processor 806.

The memory 808 includes various modules which are capable of being implemented by the processor 806 to cause various processes to take place. In various embodiments, the memory 808 includes a wall-mounted showerhead activation module 810.

The wall-mounted showerhead activation module 810 may be in electronic communication with the first motion-sensing sensor 412. The wall-mounted showerhead activation module 810 is configured to control operation of the wall-mounted showerhead 106. The wall-mounted showerhead activation module 810 may be activated in response to a trigger from the first motion-sensing sensor 412 (e.g., change in light proximate the first motion-sensing sensor 412, detection of motion past the first motion-sensing sensor 412, etc.). For example, the wall-mounted showerhead activation module 810 may be configured to activate the wall-mounted showerhead 106 after the user waves their hand past the first motion-sensing sensor 412. In another example embodiment, the wall-mounted showerhead activation module 810 may be configured to activate the lighting surface 420 on the wall-mounted showerhead 106. The wall-mounted showerhead activation module 810 may generate an internal signal to control of the wall-mounted showerhead 106 it is disposed within or may generate an external signal to control other wall-mounted showerheads 106.

The memory 808 may also include a wall-mounted showerhead setting module 812. The wall-mounted showerhead setting module 812 may be in electronic communication with the second motion-sensing sensor 414 and the third motion-sensing sensor 416. The wall-mounted showerhead activation module 810 may be activated in response to a trigger from the second motion-sensing sensor 414 and the third motion-sensing sensor 416 (e.g., change in light proximate the second motion-sensing sensor 414 and the third motion-sensing sensor 416, detection of motion past the second motion-sensing sensor 414 and the third motion-sensing sensor 416, etc.). The wall-mounted showerhead setting module 812 is further configured to detect the speed in which the user waves their hand past the second motion-sensing sensor 414 and the third motion-sensing sensor 416 by registering the time each sensor was activated. The wall-mounted showerhead setting module 812 may utilize this speed when adjusting the settings of the wall-mounted showerhead 106. For example, if the user waves their hand past the sensors in a short time frame, the wall-mounted showerhead setting module 812 may decrease the water temperature by a larger specified amount as compared to as if the user waved their hand past the sensor in a longer time frame. The wall-mounted showerhead setting module 812 may generate an internal signal to control of the wall-mounted showerhead 106 it is disposed within or may generate an external signal to control other wall-mounted showerheads 106. As utilized herein, the term "adjacent" means the specific components are in close relation to each other. Accordingly, this term should be interpreted to encompass that a component may be disposed anywhere within the shower system.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the audio speakers 502 of the exemplary embodiment shown in at least FIG. 5 may be incorporated in the wall-mounted showerhead 106 of the exemplary embodiment shown in at least FIG. 4. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower system, comprising:
   one or more valves; and
   a plurality of showerheads electrically coupled to one another such that the showerheads receive electrical signals from one another, the plurality of showerheads fluidly coupled to the one or more valves and receiving water therefrom, each of the plurality of showerheads comprising:
   a sprayer dispensing water provided by the one or more valves;
   one or more sensors registering motion gestures made by a user; and
   an integrated user interface controlling operation of the sprayer;
   wherein the one or more sensors generates an internal signal to the plurality of showerheads corresponding to the motion gesture, and wherein one of the plurality of showerheads is a master showerhead.

2. The shower system of claim 1, wherein the master showerhead generates the internal signal and an external signal corresponding to the motion gesture in response to the master showerhead registering the motion gesture.

3. The shower system of claim 2, wherein the master showerhead controls operation of the sprayer of the master showerhead based on the internal signal received by one of the one or more sensors.

4. The shower system of claim 3, wherein the master showerhead provides the external signal to the remaining of the plurality of showerheads, the remaining of the plurality of showerheads controlling operation of the sprayer of the remaining showerheads in response to receiving the external signal.

5. The shower system of claim 1, further comprising a digital valve fluidly coupled to a cold water supply and a hot water supply, the digital valve diverting water to one or more of the plurality of showerheads.

6. The shower system of claim 1, wherein the user interface comprises a master controller receiving a command from the user, and wherein the master controller generates the internal signal and the external signal based on the command from the master showerhead.

7. The shower system of claim 1, wherein one of the plurality of showerheads is an overhead showerhead comprising an overhead controller, the overhead showerhead coupled to the master showerhead and controlling actuation of the overhead showerhead.

8. The shower system of claim 1, wherein the user provides a motion gesture to the one or more sensors which activates or deactivates a flow of water between at least one of the plurality of showerheads.

9. A shower system, comprising:
   a plurality of showerheads having one or more spray modes and electrically coupled to one another and receiving electrical signals from one another,
   one or more valves fluidly coupled to the plurality of showerheads, each of the plurality of shower heads including:
   a sprayer dispensing water provided by the one or more valves;
   one or more sensors registering motion gestures made by a user; and
   an integrated user interface controlling operation of the sprayer;
   wherein the one or more valves are fluidly coupled to the one or more spray modes selectively changing the spray mode in response to the motion gesture.

10. The shower system of claim 9, wherein the one or more sensors comprise:
    a first motion-sensing sensor generating an internal signal;
    a second motion-sensing sensor controlling a temperature of water delivered to the plurality of showerheads; and
    a third motion-sensing sensor controlling the temperature of water delivered to each of the plurality of showerheads.

11. The shower system of claim 10, wherein activation of the first motion-sensing sensor generates an external signal, and wherein the controller transmits the external signal to the plurality of showerheads which changes the one or more spray modes.

12. The shower system of claim 10, wherein a length of time the motion gesture remains within a sensor range corresponds to a rise or drop in the temperature of the water.

13. The shower system of claim 9, wherein the user provides the motion gesture to the one or more sensors which changes the one or more spray modes, and wherein the one or more spray modes spray in sequence.

14. The shower system of claim 9, wherein the one or more sensors register an audio command, and wherein the audio command activates one of the one or more spray modes in response to receiving the audio command.

15. The shower system of claim 9, wherein the one or more sensors are touch-sensitive sensors, and wherein the user interacts with the touch-sensitive sensors adjusting a temperature of the water delivered to the plurality of showerheads.

16. A shower system, comprising:
a plurality of showerheads;
a plurality of sensors operably coupled to the plurality of showerheads and registering motion gestures made by a user, the plurality of sensors comprising:
   a first motion-sensing sensor generating an internal signal;
   a second motion-sensing sensor controlling a temperature of water delivered to the plurality of showerheads; and
   a third motion-sensing sensor controlling the temperature of water delivered to the plurality of showerheads; and
a controller operably coupled to the plurality of showerheads, the controller comprising a processing circuit receiving a command from the plurality of sensors;
wherein the controller controls operation of at least one of the plurality of showerheads in response to receiving the command.

17. The shower system of claim 16, wherein a length of time the motion gesture remains within a sensor range corresponds to a rise or drop in the temperature of water.

18. The shower system of claim 16, wherein the plurality of sensors generates the internal signal to one of the plurality of showerheads corresponding to the motion gesture in response to the user providing the motion gesture to one of the plurality of showerheads.

19. The shower system of claim 16, wherein the user provides a motion gesture to the plurality of sensors which activates or deactivates a flow of water between at least one of the plurality of showerheads.

20. The shower system of claim 16, wherein the plurality of showerheads includes a showerhead, an overhead showerhead, and a wall-mounted showerhead, and wherein the controller controls the showerhead, the overhead showerhead, and the wall-mounted showerhead.

* * * * *